Sept. 25, 1934.    R. BRYANT    1,974,640
HANDLE CONTROL FOR FISHING REELS
Filed Dec. 28, 1933

Inventor
ROY BRYANT
By Hiram A. Sturges Attorney

Patented Sept. 25, 1934

1,974,640

UNITED STATES PATENT OFFICE 1,974,640

HANDLE CONTROL FOR FISHING REELS

Roy Bryant, Omaha, Nebr.

Application December 28, 1933, Serial No. 704,276

6 Claims. (Cl. 242—84.1)

This invention relates to an improvement in fishing reels and more particularly to a handle control for the gear shaft of the reel, and has for its principal object to provide such a construction that the handle of the reel will remain stationary while casting.

Another object is to provide a handle control device for the above purposes which may be readily attached to fishing reels generally either at the time of manufacture or thereafter, no change in the original construction of reels being necessary to permit substitution.

Still another object is to provide a device for the above purposes which will avoid friction and permit the line to run free and to be thrown farther and with less effort than ordinarily.

It is an object to provide a device, including a pair of handles which, during the operation of fishing, will avoid the objectionable vibration and "whirring" noise generally occasioned by the whirling handles while casting, and to provide such a control of the line that the movements of a fish which has been hooked, may be suitably retarded.

With the foregoing objects in view and others which will appear, the invention presents a new and useful construction, combination and arrangement of parts as described herein and claimed, and as illustrated in the accompanying drawing, it being understood that changes may be made in form, size, proportion of parts and minor details, said changes being within the scope of the invention as claimed.

In the drawing, Fig. 1 is a plan view of a fishing reel with my handle control device mounted thereon.

Figure 5:
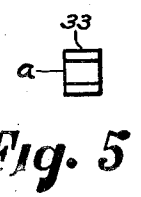
Figure 6:

Figs. 5 and 6, respectively, are face and side views of one of the dogs employed.

Figure 7:
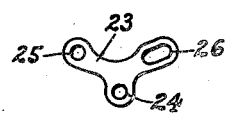
Figure 8:

Figs. 7 and 8, respectively, are plan and edge views of one of the bell cranks used.

Figure 9:
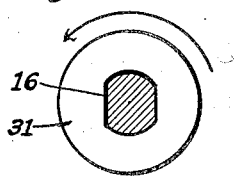
Figure 10:
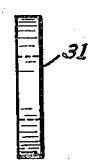

Fig. 9 is a plan view of a brake drum, the gear shaft of the reel being added in section, and Fig. 10 is an edge view of the brake drum.

Figures 11, 12:
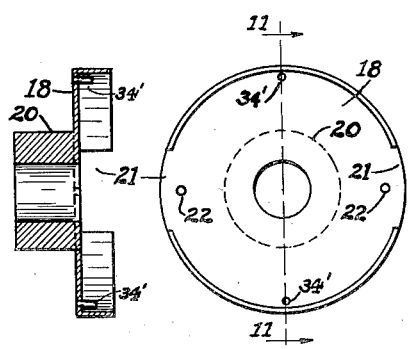

Fig. 11 is a section on line 11—11 of Fig. 12, and Fig. 12 is a plan view showing the bottom or rear side of a cylindrical housing.

Figure 1:
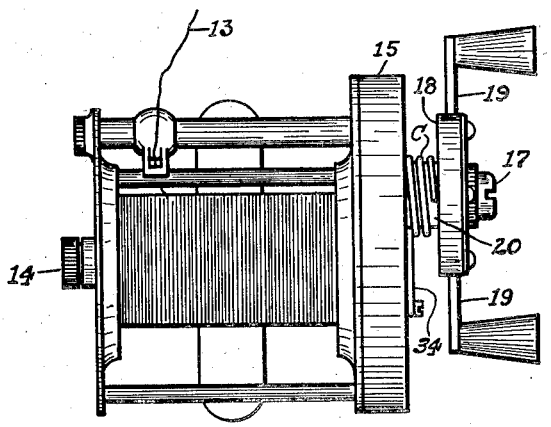
Figure 2:
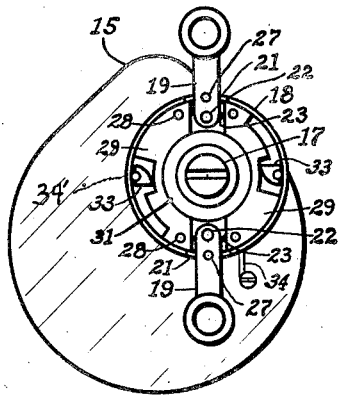
Fig. 2 is an end view of the same, the cover for the cylindrical housing being removed.

Referring now to the drawing for a more particular description, the invention is shown and described in connection with a fishing reel of ordinary construction, the line 13 being wound upon a spool or bobbin carried by a rotatable shaft 14, a gear casing 15 and a gear shaft 16 (Fig. 9), said shaft 16 having a screw 17 mounted therein as shown in Figs. 1 and 2 of the drawing.

I provide a support or cylindrical casing 18 for containing parts of the invention including the pair of handles 19, and it will be understood that, as generally constructed, the handles of fishing reels are mounted on the gear shaft 16. In practice, if the handles mentioned are removed from the shaft 16, my device may be substituted therefor, said cylindrical housing 18 having a sleeve 20 which is journalled on said shaft 16.

Numerals 21 indicate a pair of opposed openings which are formed in the peripheral flange or wall of the housing, and the handles 19 extend through these openings into the cylindrical housing a limited distance, their inner ends being pivoted at 22 to the bottom or back of the housing, and said handles may have limited swinging movements from said pivots.

Numerals 23 indicate a pair of bell cranks each being provided at its middle with an aperture 24, one of its arms being provided with an aperture 25 and its other arm being provided, longitudinally thereof, with a slot 26.

Figure 3:
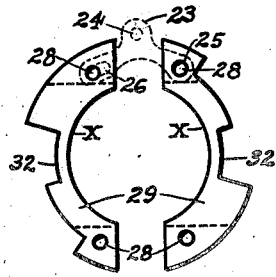
Fig. 3 is a plan view showing a pair of brake shoes, a bell crank being added thereto in dotted lines.

Numerals 27 indicate a pair of rivets (Fig. 2) each pivotally connecting a bell crank with a handle, and as best shown in Fig. 3, rivets 28 are used in pairs and operate as pivotal connections for the arms of the bell cranks with the ends of a pair of brake shoes 29.

Figure 4:
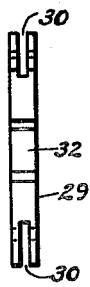
Fig. 4 is an edge view of one of the brake shoes.

The ends of the brake shoes 29 are provided with slots 30 (Fig. 4) which receive the ends of the bell cranks.

Since the brake shoes 29 are not attached directly to the housing 18 they may have sliding movements under control of the bell cranks to which they are attached, and it is obvious that if a bell crank is moved by a moving handle the shoes will be moved coincidently therewith.

Numeral 31 indicates a brake drum which is keyed to the gear shaft 16, and its periphery is adapted to be engaged by the concave walls $x$ of the brake shoes.

The brake shoes are of uniform size and proportions, and each shoe is provided with a recess 32 opening on its outer wall. Numerals 33 indicate a pair of dogs (Figs. 2, 5, 6), each provided with a recess $a$ in one of its sides, and each being formed outwardly convergent toward its sharpened end $b$. Each dog is disposed with its recess a in engagement with a pivot pin 34' (Figs. 2, 12) upon which it may have rocking movements while disposed in a recess 32 of a brake shoe.

The pivotally mounted dogs in the recesses 32 engage the brake shoes, and the parts are of such proportion that when a handle has a swinging movement in one direction the dogs will press the shoes against the brake drum for retarding or checking the rotation of the gear shaft 16, and a reverse movement of a handle will move the shoes outwardly from the brake drum, the dogs having a reverse sliding movement.

When the brake shoes, by action of a handle and the bell cranks, have been moved firmly against the brake drum, the dogs operate to maintain this braking contact until the handle has been manually swung in a reverse direction.

In operation, one or both handles may be used. Since the ends of the brake shoes are attached to each other by the bell cranks, they move as a unit.

Numeral 34 indicates a spring which is secured at one end to the side of the casing 15, said spring having a helical part c which is wound upon the sleeve 20 of the cylindrical housing.

This spring operates as a brake for a control of a rotatable movement of the housing 18 on the gear shaft 16.

Since it is wound anti-clockwise it does not interfere with the operation of casting.

During the operation of casting, the gear shaft and brake-drum 31 will rotate in the direction indicated by the arrow shown in Fig. 9 of the drawing which automatically releases the dogs from the brake-shoes, said brake-shoes being disengaged from the brake-drum to permit free rotation of the spool, and a free unwinding of the line for said casting.

Since the spring is wound anti-clockwise on the sleeve 20 it permits this free unwinding of the line, and also prevents any clockwise movement of the sleeve 20 during the unwinding of the line from the spool.

In other words the spring operates to hold the housing in a stationary position on the gear shaft until the brake drum's rotation in the direction of the arrow releases the brake-shoes from the brake-drum and moves the dogs to released position.

I claim as my invention,—

1. In a handle control for the gear shaft of a fishing reel, a support formed as a cylindrical housing having a sleeve journalled on said gear shaft and provided with a pair of opposed peripheral apertures, a pair of handles in said apertures pivotally mounted at their inner ends, a brake drum keyed to the gear shaft and disposed in the housing, a pair of opposed segmental brake shoes each provided with a recess and disposed in said housing, a pair of bell cranks each movable by and pivotally attached to a handle with its arms pivotally mounted on one of the ends of the brake shoes, and a pair of dogs mounted to permit swinging movements in the recesses of the brake shoes, said brake shoes being coincidently movable in reverse directions against said dogs by action of a bell crank for moving said brake shoes into contact with the brake drum.

2. In a handle control for the gear shaft of a fishing reel, a cylindrical support journalled on said shaft, a pair of handles pivotally mounted at their inner ends on the support, a brake drum movable with the gear shaft, a pair of opposed brake shoes at the sides of the brake drum each shoe being provided with a recess, a pair of bell cranks movable by action of a handle each having its arms pivotally mounted on the brake shoes, and a pair of dogs mounted on the support to permit swinging movements in the recesses of the brake shoes, said brake shoes being adapted to have coincident movements in reverse directions against said dogs by action of a bell crank for pressing the brake shoes against the brake drum.

3. In a handle control for the gear shaft of a fishing reel, a cylindrical housing having a sleeve journalled on said shaft, a brake drum in the housing and keyed to the shaft, a pair of handles pivotally mounted within and projecting outwardly of said housing, a pair of opposed brake shoes in the housing at the sides of the brake drum, a pair of dogs mounted to permit swinging movements in the housing, a pair of bell cranks within the housing each pivotally mounted on a handle and pivotally attached to said brake shoes and adapted to be coincidently moved in reverse directions by a movement of a handle for moving the brake shoes against said dogs to cause pressure of said shoes against the brake drum.

4. In a handle control for the gear shaft of a fishing reel, a cylindrical housing having a sleeve journalled on said shaft, a brake drum mounted on said shaft, handles mounted to swing from said housing, a pair of brake shoes in the housing, a pair of dogs pivotally mounted in the housing, a pair of bell cranks pivotally attached to said handles and movable in reverse directions against said dogs by a swinging movement of a handle to permit engagement of said shoes with the brake drum by action of said dogs, and resilient means mounted on the reel and engaging the sleeve of said cylindrical housing for controlling one of the movements of said brake shoes.

5. In a handle control for the gear shaft of a fishing reel, a cylindrical support journalled on said shaft, a brake drum on said shaft, brake shoes at the sides of the brake drum, a pair of bell cranks pivotally mounted on the ends of the brake shoes, a pair of handles fulcrumed on the support and pivotally connected with the bell cranks, one of said handles being movable in a circle's arc for coincidently actuating the bell cranks to cause coincident movements of the brake shoes toward the brake drum, and a pair of pivotally mounted dogs on the support for pressing the moving brake shoes into engagement with the brake drum.

6. In a handle control for the gear shaft of a fishing reel, a cylindrical housing journalled on said shaft, a brake drum in the housing movable with the gear shaft, a pair of brake shoes in the housing at opposed sides of the brake drum, a pair of opposed handles pivotally mounted on the housing, a pair of bell cranks each having a slot formed in one of its arms and provided with an aperture in its other arm, pivots traversing said apertures and slots of said arms for attaching the brake shoes to the bell cranks, one of said handles being movable for moving the brake shoes coincidently toward the brake drum, and a pair of pivotally mounted dogs on the support for pressing the moving brake shoes against the brake drum.

ROY BRYANT.